United States Patent [19]

Reymond et al.

[11] 4,209,254

[45] Jun. 24, 1980

[54] SYSTEM FOR MONITORING THE MOVEMENTS OF ONE OR MORE POINT SOURCES OF LUMINOUS RADIATION

[75] Inventors: Jean-Claude Reymond; Jean-Luc Hidalgo, Paris, France

[73] Assignee: Thomson-CSF, Paris, France

[21] Appl. No.: 8,765

[22] Filed: Feb. 1, 1979

[30] Foreign Application Priority Data

Feb. 3, 1978 [FR] France .................. 78 03099

[51] Int. Cl.$^2$ .................................. G01B 11/26
[52] U.S. Cl. .............................. 356/152; 356/141
[58] Field of Search ...................... 356/1, 141, 152

[56] References Cited

U.S. PATENT DOCUMENTS

| | | | |
|---|---|---|---|
| 3,951,550 | 4/1976 | Slick | 356/141 |
| 3,989,384 | 11/1976 | Friedman | 356/152 |
| 4,004,852 | 1/1977 | Pentecost | 356/1 |
| 4,039,825 | 8/1977 | Doyle | 356/152 |
| 4,092,072 | 5/1978 | Ellis | 356/152 |
| 4,111,555 | 9/1978 | Ellis | 356/152 |
| 4,136,568 | 1/1979 | Seymour | 356/141 |

*Primary Examiner*—S. C. Buczinski
*Attorney, Agent, or Firm*—Karl F. Ross

[57] ABSTRACT

Several virtually punctiform, sequentially excited sources of luminous radiation on a pilot's helmet facilitate continuous determination of the pilot's line of sight with the aid of a linear array of photoelectric cells illuminated via a pair of mutually parallel cylindrical lenses perpendicular to the array. The light path through one of these lenses includes a beam rotator in the form of two juxtaposed prisms which turns one of two sheets of light rays from an excited source, lying originally in two mutually orthogonal planes, through 90° into a plane including the axis of one of the lenses so as to intersect the array in one point while the other sheet of light rays retains its orientation in passing through the axis of the other lens to intersect the array in another point. The locations of the two points of intersection, periodically detected by a charge-coupled scanner, indicate the momentary direction of the active source whose exact position can thus be established with the aid of two radiation sensors of the type described. Alternatively, with three point sources whose mutual distances are known, the positions of these sources can be derived from their respective directions as determined by one such sensor. The nonrotated sheet of rays may pass through a simple prism serving to compensate for the difference in the path lengths of the two sheets. Two pulse counters normally synchronized with the scanner are stepped at half their normal rate in the presence of an output signal from the scanner indicative of incident radiation, thereby determining the position of a cell at or near the middle of a series of neighboring cells illuminated by such radiation.

12 Claims, 9 Drawing Figures

SYSTEM FOR MONITORING THE MOVEMENTS OF ONE OR MORE POINT SOURCES OF LUMINOUS RADIATION

FIELD OF THE INVENTION

Our present invention relates to a system for monitoring the movement of a virtual point source of luminous radiation relative to a detection site.

BACKGROUND OF THE INVENTION

Systems of this general type have been used in the past for automatically tracking the sun from a vehicle; see U.S. Pat. No. 3,084,261. More recent uses have been in the field of keeping track of the head motion of a person operating a vehicle, specifically the pilot of an aircraft holding a target in sight. Thus, as described for example in U.S. Pat. No. 3,917,412, a pilot's helmet may be equipped with two radiation emitters irradiating a pair of detectors whose outputs, fed to a computer, enable the determination of the pilot's line of sight paralleling the line of intersection of two planes, each of these planes being defined by the two emitters and by the location of the respective detector.

In the case of a single point source, its direction as seen from a sensing device can also be established with the aid of two slits perpendicular to each other in a mask otherwise opaque to the emitted radiation, these slits being traversed by flat beams or sheets of incident rays lying in mutually orthogonal planes whose orientation can be ascertained with the aid of two elongate radiation detectors respectively intersected by these beams. See, in this connection, U.S. Pat. No. 3,951,550. A modification of that system, described in French Pat. No. 2,322,356, utilizes a V-shaped slit training two flat beams from the same source upon a single elongate radiation detector whose points of intersection with these beams indicate the direction of the source.

OBJECTS OF THE INVENTION

The principal object of our present invention is to provide an improved radiation-monitoring system of the general type described, utilizing only one elongate radiation detector for direction determination while avoiding the use of slitted masks so as to make available a broad field of radiant energy for the localized illumination of that detector.

Another object is to provide means in such a system for locating the center of a narrow beam impinging upon such a radiation detector.

SUMMARY OF THE INVENTION

In accordance with our present invention, a radiation sensor coacting with one or more virtual point sources comprises a first and a second cylindrical lens member extending parallel to each other across an elongate radiation detector to focus incident rays from such a source onto certain portions of the detector, e.g. one or more photocells closely juxtaposed in a linear array. The path of radiation incident on the first lens member includes beam-rotating means for turning a first sheet of rays, lying in one of two mutually orthogonal planes, through 90° into a third plane which includes the axis of the first lens member. A second sheet of rays transverse to the first sheet passes through the axis of the second lens member whereby the two sheets of rays intersect the radiation detector at respective points defining with the lens axes the positions of the two mutually orthogonal planes. The locations of these points of intersection are ascertained by output circuitry coupled to the radiation detector and connected to a processor which determines from these locations the direction of the source with respect to the radiation detector.

Advantageously, the two cylindrical lens members are of planoconvex configuration with coplanar flat faces confronting the radiation detector. The latter, pursuant to a more particular feature of our invention, preferably comprises a pair of overlappingly juxtaposed, relatively inverted prisms with planes of symmetry inclined at 45° to each other.

In order to compensate for parallactic errors due to differences in the path lengths of the rays traversing the two lens members, a transparent body of suitable refractive index may be disposed in the path of radiation incident on the second lens member.

It will be understood that the two cylindrical lens members intercept not only the aforementioned planar sheets of incident rays, whose relative orientation has been discussed above, but an entire field of radiation respectively focused by each lens member upon a line intersecting the radiation detector, preferably at right angles to the detector axis. Our improved system, therefore, is considerably more sensitive than one using a slitted mask for the establishment of two narrow beams.

The output circuitry associated with the radiation detector may comprise a scanner of the charge-soupled type sequentially sampling the cells of the linear array in a succession of cycles. Such charge-coupled devices (CD), whose mode of operation resembles that of a shift register, are well known in the art; see, for example, an article by James Meek in "Journal of Electronic Engineering," February 1975, pages 38–44, and an article by John Mavor in "Wireless World," January 1975, pages 13–16. The scanner, feeding its output signals to a threshold circuit, is advanced by clock pulses from a timer which also stops a pulse counter or, preferably, a pair of such counters alternately loading two buffer registers for the storage of respective counts indicating the ranks of illuminated photocells—i.e. their positions within the array—respectively irradiated by the beams traversing the two lens members.

Even with a pair of carefully designed cylindrical lenses, the beams respectively focused by them upon the radiation detector will generally illuminate several adjoining cells simultaneously since, with the sources located at finite and variable distances from the sensor, their linear images will not precisely coincide with the focal planes of the lenses. According to an advantageous further feature of our invention, therefore, we control the stepping of the counter or counters by the timer in such a way that the counting rate is halved in response to an output signal from the threshold circuit indicative of detected radiation whereby the rank indicated by the count refers to a cell at or near the middle of a series of simultaneously illuminated cells.

The radiation emitted by the source or sources may lie outside the visible spectrum, e.g. in the infrared range, and may be sorted out by wave filters interposed between the lens members and the detector.

BRIEF DESCRIPTION OF THE DRAWING

The above and other features of our present invention will now be described in detail with reference to the accompanying drawing in which.

SPECIFIC DESCRIPTION

Figure 3:
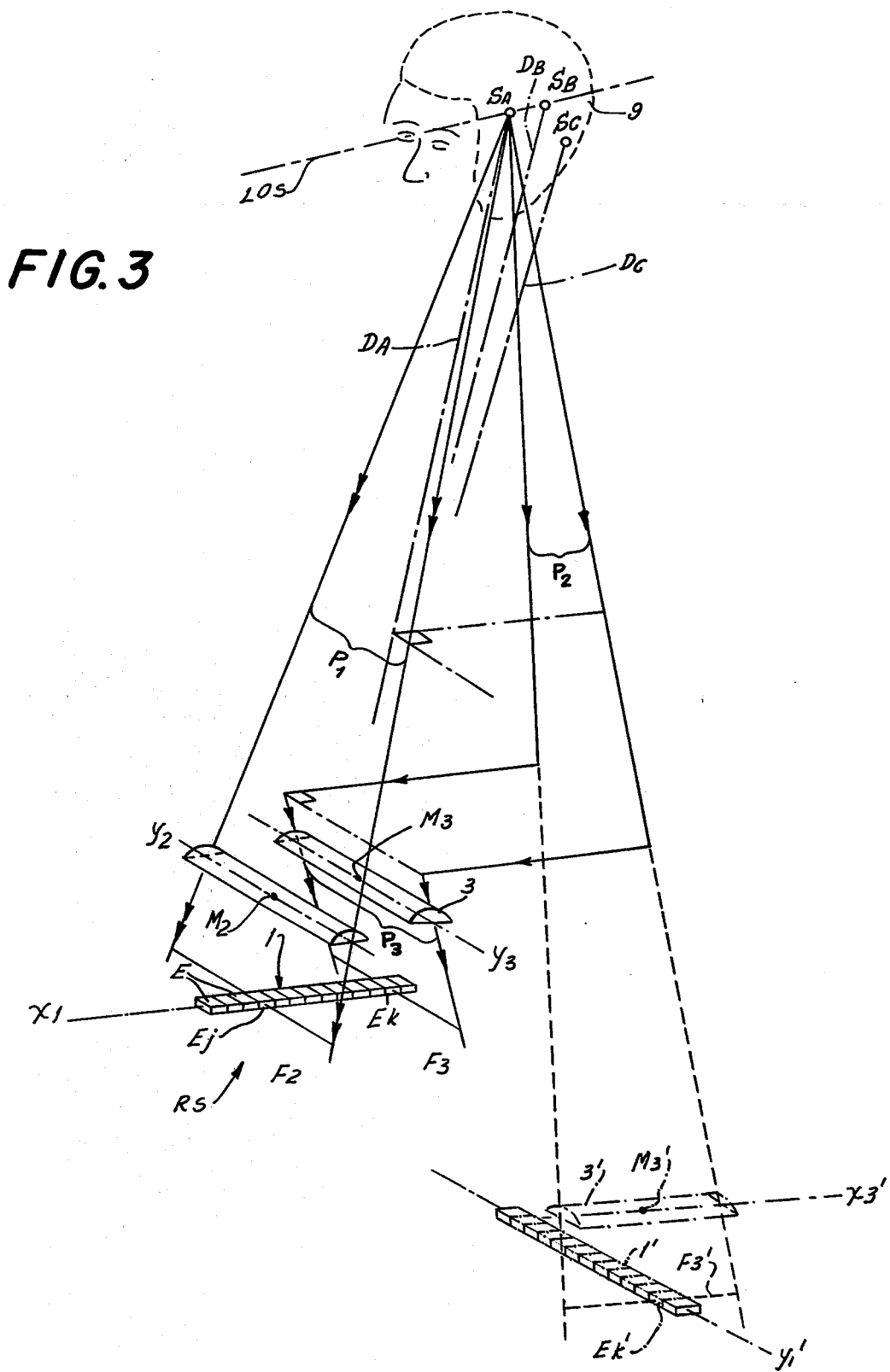
FIG. 3 schematically illustrates the overall monitoring system according to our invention, with the beam rotor omitted for the sake of simplicity.

Reference will first be made to FIG. 3 showing a pilot's helmet 9 having a group of light-emitting diodes or equivalent radiation sources $S_A$, $S_B$, $S_C$ mounted on one side thereof; a similar group, not shown, may be carried on the opposite side of the helmet. Sources $S_A$ and $S_B$ lie on a line LOS representing or closely paralleling the line of sight of the pilot. At $D_A$, $D_B$ and $D_C$ we have indicated the directions of these sources as seen from a detection site at a fixed location in the cockpit of an aircraft piloted by the wearer of helmet 9; those directions may be related to a reference point O at the center of an elongate radiation detector 1 consisting of a linear array of closely juxtaposed photocells generally designated E.

Figure 1:
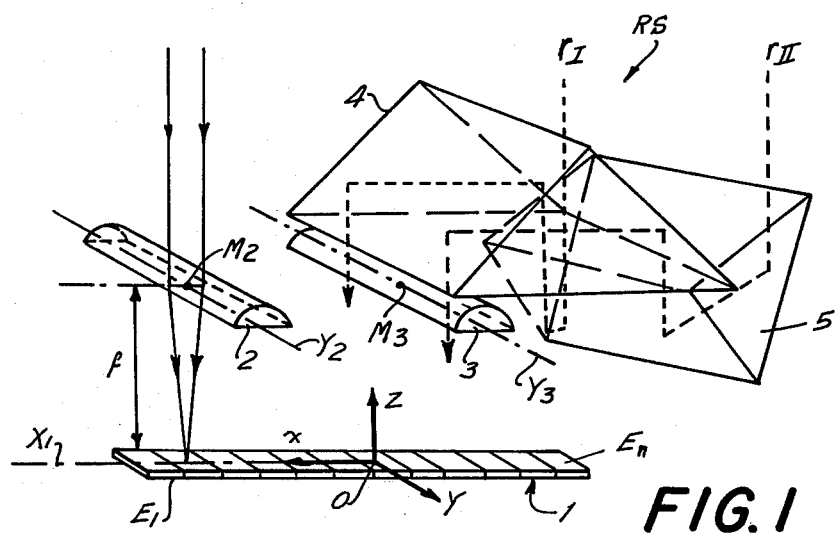
FIG. 1 is an isometric view of a radiation sensor embodying our invention.

Sources $S_A$, $S_B$ and $S_C$ are sequentially energized, as more fully described hereinafter, to facilitate their tracking by a radiation sensor RS including the detector 1, centered on an axis $x_1$, and a pair of planoconvex cylindrical lenses 2, 3 with mutually parallel axes $y_2$, $y_3$ and focal lines $F_2$, $F_3$ lying in planes of symmetry perpendicular to axis $x_1$. The flat lower faces of lenses 2 and 3 are coplanar and are separated from a confronting upper face of detector 1 substantially by their focal length f as indicated in FIG. 1, focal lines $F_2$ and $F_3$ thus lying close to the level of that face.

Upon excitation of source $S_A$, the radiation emitted by that source contains two sets of light rays lying in mutually orthogonal planes $P_1$ and $P_2$. In the simplified presentation of FIG. 3, plane $P_1$ includes the axis $y_2$ of lens 2 whereas plane $P_2$ includes an axis $x_3'$ of a virtual image $3'$ of lens 3 which is formed by a beam rotator not shown in FIG. 3 but illustrated in detail in FIGS. 1 and 2A–2C. The same beam rotator produces a virtual image $1'$ of radiation detector 1 perpendicular to plane $P_2$, the image of axis $x_1$ being shown at $y_1'$. Actually, however, the rays in plane $P_2$ are transposed by the beam rotator to a plane $P_3$ which includes the lens axis $y_3$ and, like plane $P_1$, is thus generally transverse to detector axis $x_1$. Lenses 2 and 3 have midpoints $M_2$, $M_3$, the latter being imaged at $M_3'$; points $M_2$, $M_3$ and axis $x_1$ define a plane bisecting these lenses.

The two planes $P_1$ and $P_3$ intersect the detector 1 at two points represented by respective cells $E_j$ and $E_k$, the last-mentioned cell having an image $E_k'$ in line with plane $P_2$. In practice, however, because of unavoidable optical distortions, the rays incident upon lenses 2 and 3 will not exactly converge upon their respective focal lengths $F_2$ and $F_3$ so that more than one cell at a time may be illuminated. The image of focal line $F_3$ has been shown at $F_3'$.

Figure 2A:
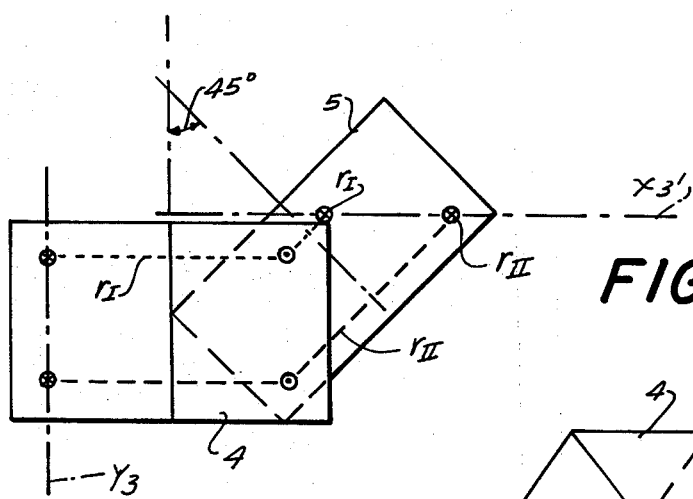
FIGS. 2A, 2B and 2C are, respectively, a top view and two side views of a beam rotator included in the sensor of FIG. 1.
Figure 2C:
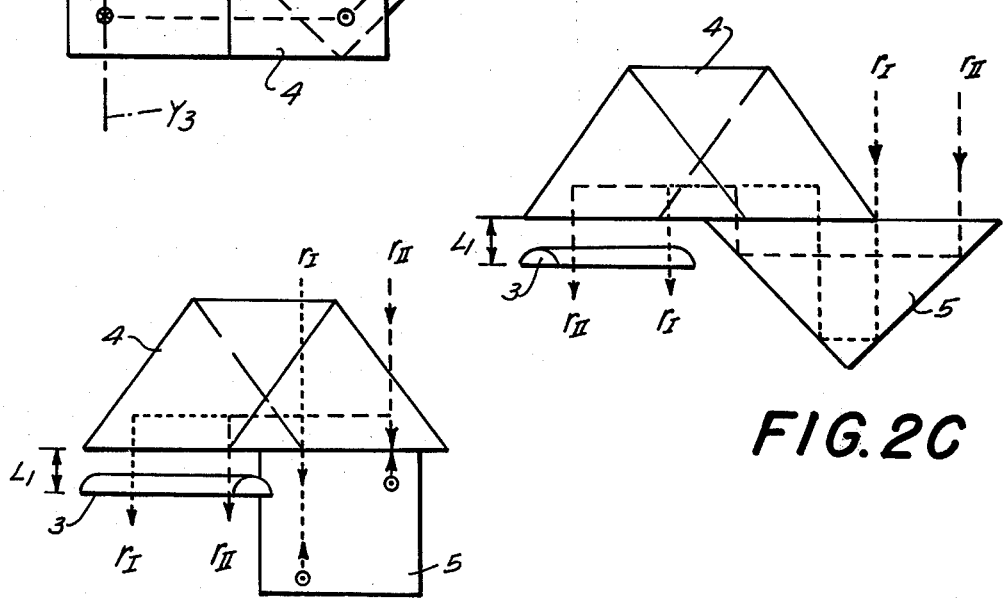
Figure 2B:
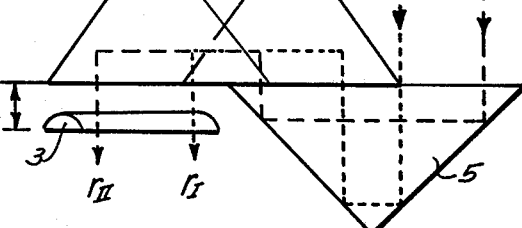

FIGS. 1, 2A, 2B and 2C show the aforementioned beam rotator as comprising a pair of prisms 4 and 5 with profiles in the form of right isosceles triangles, the broad prism faces of the hypotenuses of the triangles being coplanar and in contact with each other at a level above that of lenses 2 and 3, separated by a distance $L_1$ from the plane of the lower lens faces. The planes of symmetry of these prisms include a 45° angle with each other, as best seen in FIG. 2A. The midplane of prism 4 is parallel to the yz plane of the cartesian coordinate system xyz (with origin O) and thus to the axes of lenses 2 and 3.

With about half the broad upper face of prism 5 overlain by the prism 4, the other half of that face intercepts incident rays from any sources $S_A$14 $S_C$ and directs them, by internal reflection, into the adjoining prism 4 of like refractive index where they are further reflected to leave by the unobstructed half of the broad lower face of the latter. This has been particularly illustrated for two rays $r_I$ and $r_{II}$, parallel to the z axis, impinging perpendicularly upon prism 5 at points registering in FIG. 2A with the image axis $x_2'$. After their reflection, the rays emerge from prism 4 in registry with lens axis $y_3$ as viewed in FIG. 2A. Thus, the plane of these two rays has been rotated through 90° on their passage through the prism pair. Naturally, the entire ray bundle striking the exposed part of the upper face of prism 5 experiences the same noninverting rotation.

Figure 4:
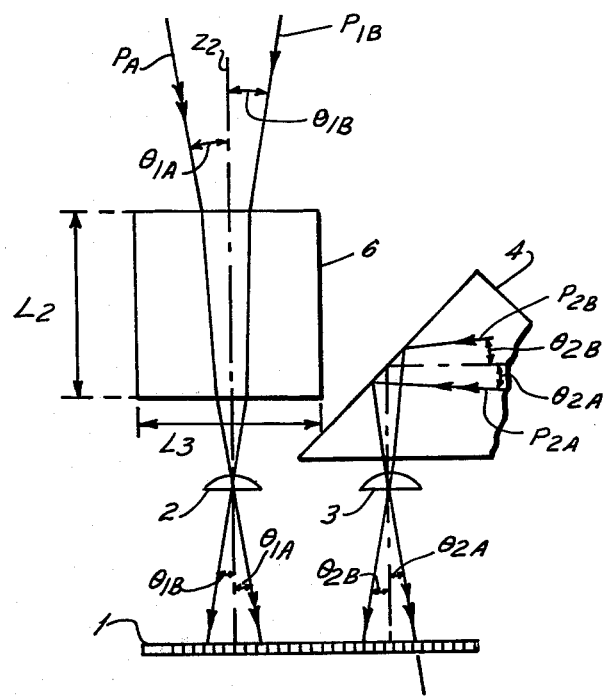
FIG. 4 shows part of the sensor of FIG. 1 modified by the addition of a path-length compensator.

As illustrated in FIG. 4, a prismatic transparent block 6 of height $L_2$ and width $L_3$ is advantageously interposed in the path of the light rays which bypass the prism assembly 4, 5 to impinge upon lens 2. Oblique light rays reaching lens 3 via the beam rotator constituted by these prisms have their paths seemingly foreshortened by their refraction at the entrance and exit faces even though these paths are actually lengthened by the multiple internal reflections; thus, the emitting sources appear to be closer to detector 1 than they are in fact so that their angles of incidence are greater than they would be with direct illumination. While this phenomenon affords easier distinction between different sources or different positions of the same source, it also gives rise to a parallactic error. A similar apparent foreshortening of the light path for the rays falling upon lens 2 is achieved by a suitable choice of the dimensions and the refractive index of block 6. Thus, we have illustrated in FIG. 4 two planar sheets of rays $P_{1A}$, $P_{1B}$ with different angles of incidence $\Theta_{1A}$, $\Theta_{1B}$ traversing the lens axis $y_2$ by way of block 6, on opposite sides of the longitudinal midplane of lens 2, and two similar sheets of rays $P_{2A}$, $P_{2B}$ with angles of incidence $\Theta_{2A}$, $\Theta_{2B}$ traversing the lens axis $y_3$ by way of prisms 5, 4 (only the latter being seen in FIG. 4). The parallactic error introduced by transparent bodies 4–6 will, of course, have to be taken into account in determining the true location or direction of the active source. The interposition of block 6 places the apparent positions of the flat faces of lens 2 and lens image $3'$ substantially at the same level.

Figure 5:
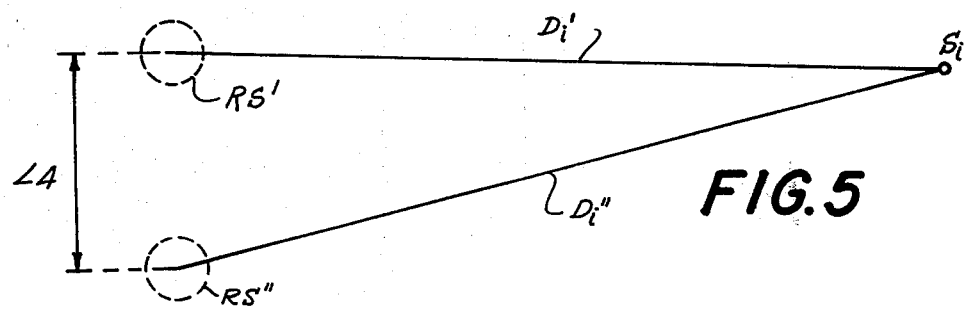
FIG. 5 is a diagram illustrating the pinpointing of a radiation source with the aid of a pair of sensors according to our invention.

FIG. 5 diagrammatically illustrates two sensors RS', RS", each of the type described with reference to FIGS. 1–4, which are separated by a distance $L_4$ and receive light from a source $S_i$ along respective directions of incidence $D_i'$, $D_i''$. With such an arrangement the source $S_i$ can be pinpointed by simple triangulation.

With the use of a single sensor and three sources $S_A$, $S_B$, $S_C$ (FIG. 3) excited at different times but in close succession, the establishment of their respective directions of incidence $D_A$, $D_B$, $D_C$ also enables the location of each source to be determined inasmuch as the distance between any two sources is invariable and known. The combined use of three or more sources and at least two sensors on each side of helmet 9 provides immediate verification of the obtained readings with the aid of the two procedures described; moreover, with the sources necessarily close to one another, a triangulation with the aid of two relatively widely separated sensors is more exact than a calculation of distance based upon the directions of incidence $D_A$, $D_B$, $D_C$.

If the lens 2 and the lens image 3' are presumed to be respectively bisected by the xz and yz planes, and if the receiving face of detector 1 lies in the xy plane so that the origin O coincides with the center of that face as assumed above, the coordinates of intersection points $E_j$, $E_k'$ and midpoints $M_2$, $M_3'$ will be $E_j(x_j,0,0)$, $E_k'(0,y_k,0)$, $M_2(x_{m2},0,z_{m2})$ and $M_3'(0,y_{m3},z_{m3})$. The two planes $P_1$ and $P_2$ respectively including the axes of lens 2 and lens image 3' can then be defined by $$z_{m2}x + (x_j - x_{m2})z = z_{m2}x_j$$

for the plane $P_1$ and $$z_{m3}y + (y_k - y_{m3})z = z_{m3}y_k$$

for the plane $P_2$. From these two equations the direction of incidence $D_A$ can be derived in terms of analytic geometry. The other directions $D_B$ and $D_C$ are obtainable in an analogous manner upon excitation of the respective sources $S_B$ and $S_C$ in lieu of source $S_A$.

Figure 6:
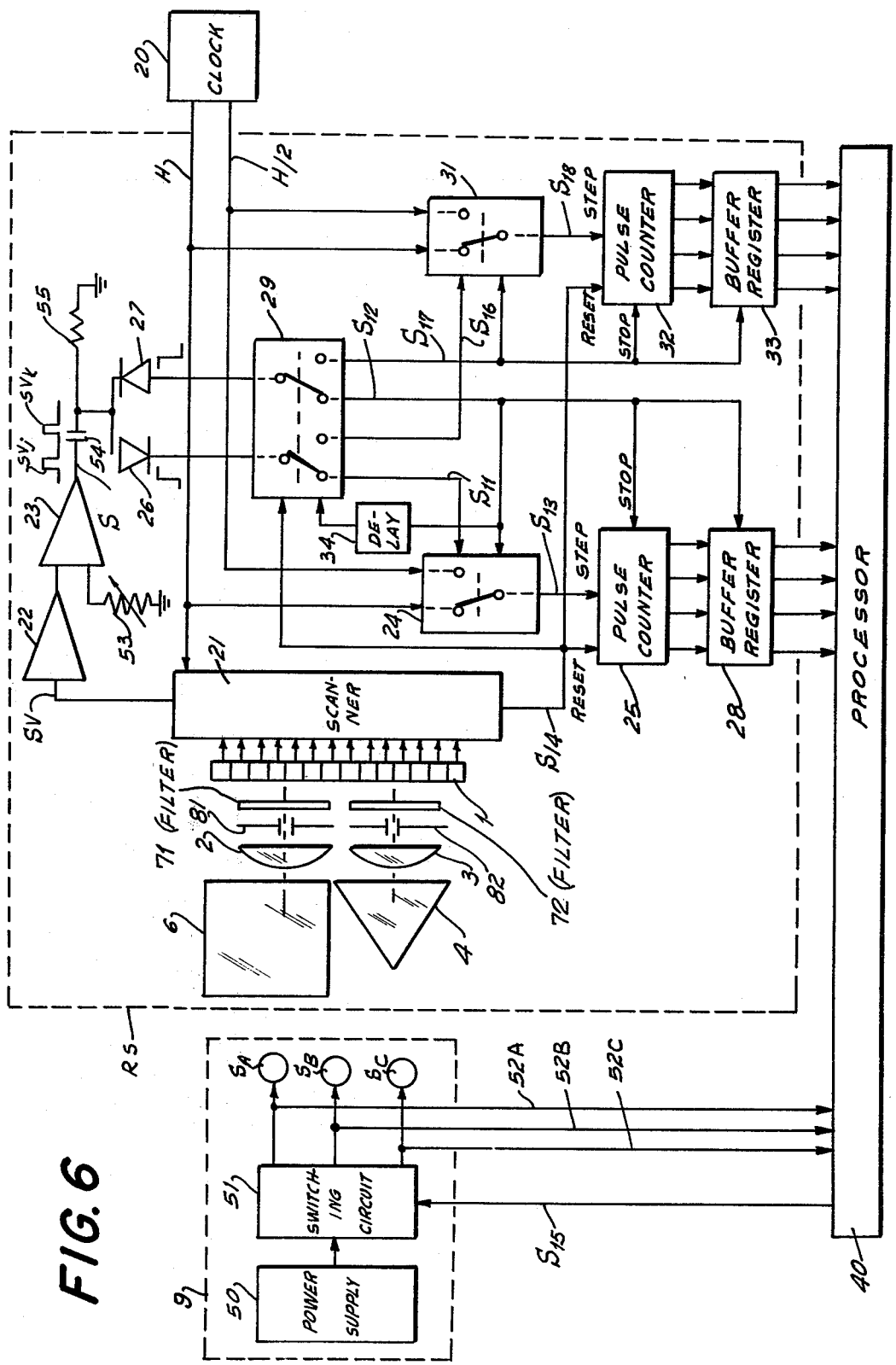
FIG. 6 is a circuit diagram of the electrical components of our monitoring system.

Reference will now be made to FIG. 6 for a description of an electrical circuit arrangement designed to evaluate the information available from a given radiation sensor RS. A rectangle 9, symbolizing the pilot's helmet of FIG. 3, carries a power supply 50 adapted to feed the several sources $S_A$, $S_B$, $S_C$ through a switching circuit 51 under the control of a switchover signal $S_{15}$ periodically emitted by a processor 40; the excitation of any source is reported back to the processor via a respective line 52A, 52B, 52C. Radiation detector 1 is here shown to be illuminated from block 6 and lens 2 via a slit diaphragm 81 and a filter 71; a similar slit diaphragm 82 and filter 72 are interposed between the detector and lens 3. The two slit diaphragms 81, 82, provided for sharper focusing, should of course give passage to rays from any source position within the range to be monitored. Filters 71 and 72 serve to exclude ambient illumination by passing only the spectral band (preferably infrared light) emitted by any sources $S_A$-$S_C$.

A scanner 21, advantageously an integrated shift-register circuit of the CCD type discussed above, has a multiplicity of stages respectively connected to the several photocells of detector 1 and is steppable by clock pulses H from a timer 20 to transfer the charges received from the detector through an amplifier 22 to one input of a comparator 23 whose other input receives a threshold voltage from an adjustable supply 53. The output signal SV of scanner 21, after amplification in component 22, gives rise to a signal $S_{10}$ including a pair of flat-topped peaks $SV_j$, $SV_k$ in the output of threshold comparator 23. These peaks are differentiated in an R/C network 54, 55 feeding a pair of antiparallel diodes 26, 27; diode 26 passes only their rising flanks $S_{11}$, $S_{16}$ (FIG. 7) whereas diode 27 passes only their falling flanks $S_{12}$, $S_{17}$. The positive spikes from diode 26, corresponding to flanks $S_{11}$ and $S_{16}$, are respectively directed by a switching circuit 29 to control inputs of two second-state switching circuits 24, 31 also having other control inputs connected to receive the negative spikes from diode 27, corresponding to flanks $S_{12}$ and $S_{17}$, which are respectively directed thereto by the first-stage switching circuit 29.

Timer 20 also generates another set of clock pulses H/2, of half the cadence of clock pulses H, the two sets of clock pulses being transmitted in parallel to respective inputs of switching circuits 24 and 31 for alternate delivery to a pair of pulse counters 25, 32 as stepping pulses $S_{13}$, $S_{18}$. These pulse counters, working into respective buffer registers 28 and 33, are periodically zeroized by a resetting signal $S_{14}$ emitted by the scanner 21 at the end of each sweep cycle in which the charges received from any photocell of detector 1 are transferred in the form of output signal SV to amplifier 22 and comparator 23. Pulse counters 25 and 32 are arrested by spikes $S_{12}$ and $S_{17}$ respectively applied to stopping inputs of these counters as well as to loading inputs of the associated buffer registers 28 and 33. With the stage outputs of registers 28 and 33 connected to processor 40, the latter thus receives the readings of both pulse counters after each sweep cycle. The switchover signal $S_{15}$ may be generated after every sweep cycle or after a certain number of consecutive cycles.

Figure 7:
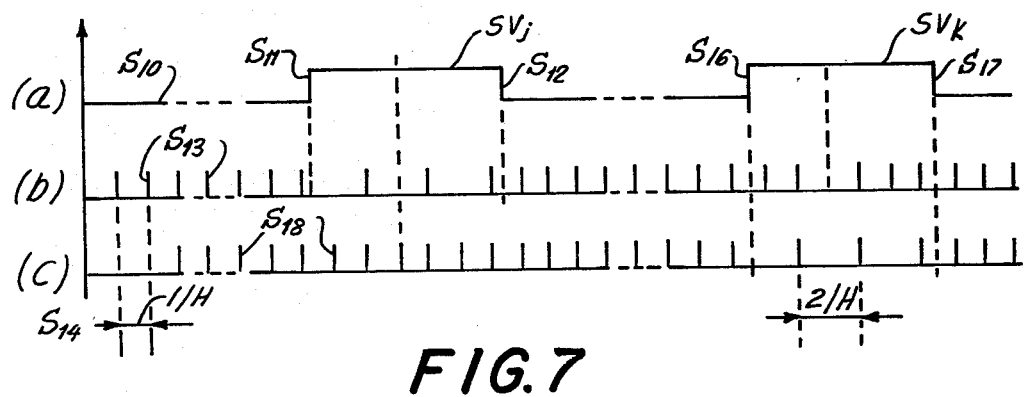
FIG. 7 is a set of graphs relating to the operation of the circuitry shown in FIG. 6.

In FIG. 7, whose graph (a) shows the output signal $S_{10}$ of threshold comparator 23 with its rectangular peaks $SV_j$ and $SV_k$, we have indicated in graphs (b) and (c) the trains of counting pulses $S_{13}$ and $S_{18}$ applied to the stepping inputs of pulse counters 25 and 32. As long as signal $S_{10}$ is low, the two counters are stepped rapidly at the high rate 1/H of clock pulses H. When the leading edge $S_{11}$ of the first peak $SV_j$ is encountered, spike $S_{11}$ reverses the switching circuit 24 whose control input it reaches by way of circuit 29 which assumes its illustrated position under the control of resetting signal $S_{14}$ before the start of any sweep cycle. Counter 25, therefore, is now stepped at the slower rate 2/H by the clock pulses H/2 while registering a count representing the rank of the first illuminated cell $E_j$ of detector 1. Actually, as indicated in FIG. 7, the signal peak $SV_j$ spans six consecutive cycles of clock pulses H corresponding to an illumination of six neighboring photocells by way of lens 2; the reduction of the stepping speed of pulse counter 25, however, insures that buffer register 28 is loaded upon the occurrence of the spike $S_{12}$ with a count which identifies the third rather than the last one of the illuminated neighboring cells. Spike $S_{12}$ also restores the original position of switching circuit 24, yet counter 25 arrested by that same spike is no longer stepped by the pulses $S_{13}$ now again coinciding with the fast clock pulses H.

It will be apparent that the above-described halving of the counting rate in the presence of detected radiation may also be used in a system in which the pulse counters 25, 33 determine the positions of illuminated cells on two separate radiation detectors respectively irradiated through mutually orthogonal slits, for example.

Through a delay line 34, spike $S_{12}$ is also transmitted to a control input of switching circuit 29 which therefore directs the next two spikes $S_{16}$ and $S_{17}$, derived from peak $SV_k$, to switching circuit 31, pulse counter 32 and buffer register 33. Thus, stepping pulses $S_{18}$ are slowed to half their previous cadence in response to the leading edge of peak $SV_k$ as the counter 32 loads the buffer register 33 with a count identifying the rank of the third of the six neighboring cells illuminated via lens 3. Spike $S_{17}$, which stops the pulse counter 32 and discharges the contents of register 33 into processor 40, also returns the switching circuit 31 to its illustrated normal position.

The three sources $S_A$-$S_C$ on each side of helmet 9 are advantageously represented by LED's of the fast-switching type with a rise time of less than 1 ms, emitting their radiation over a wide area encompassing close to $2\pi$ steradians. The scanner 21 may have a sweep cycle of less than 2 ms; in practice, the number of photocells of detector 1 sampled in such a cycle may be as high as 1,700. Lenses 2 and 3 may have axial lengths on the order of 2 cm, focal lengths of about 15 to 20 mm and an aperture of 3 to 5 mm. Naturally, each of these lenses could also be replaced by a more elaborate optical system.

Processor 40 evaluates the pulse counts received in each cycle from registers 28 and 33, as well as from corresponding registers of other sensors, if any, and performs the calculations required for establishing the instantaneous locations of sources $S_A$-$S_C$ together with the line of sight LOS (FIG. 3). This information may be transmitted to a visual indicator or some other load aboard the aircraft or elsewhere.

We claim:

1. In a system for monitoring the movement of a virtual point source of luminous radiation relative to a detection site, the combination with said source of a radiation sensor at said detection site comprising:

an elongate radiation detector;

a first and a second cylindrical lens member disposed parallel to each other across said detector and focused upon the latter to direct incident radiation from said source onto limited portions thereof;

beam-rotating means in the path of radiation incident on said first lens member for turning a first sheet of rays incident in a first plane, orthogonal to a second plane containing a second sheet of incident rays, through 90° into a third plane including the axis of said first lens member, said second sheet of rays passing through the axis of said second lens member whereby said sheets of rays intersect said detector at respective points defining with said axes the positions of said first and second planes;

output circuitry coupled to said detector for ascertaining its points of intersection with said sheets of rays; and processing means connected to said output circuitry for determining from the locations of said points of intersection the direction of said source with respect to said detector.

2. The combination defined in claim 1 wherein said lens members are planoconvex with coplanar flat faces confronting said detector.

3. The combination defined in claim 1 and 2 wherein said beam-rotating means comprises a pair of overlappingly juxtaposed, relatively inverted prisms with planes of symmetry inclined at 45° to each other.

4. The combination defined in claim 3, further comprising a transparent body in the path of radiation incident on said second lens member to compensate for differences in the lengths of said paths.

5. The combination defined in claim 1 or 2, further comprising filter means and diaphragm means interposed between said lens members and said detector.

6. The combination defined in claim 1 or 2 wherein said detector is a linear array of closely juxtaposed cells, said output circuitry comprising scanning means for sequentially sampling said cells in a succession of sweep cycles, threshold means connected to said scanning means for receiving therefrom an output signal varying with the degree of illumination of the sampled cells, timing means responsive to said threshold means for advancing said scanning means at a predetermined speed, pulse-counting means stepped by said timing means and controlled by said threshold means for determining the rank of an illuminated cell in said array, first storage means for registering the count of said pulse-counting means identifying the rank of a cell illuminated through one of said lens members, second storage means for registering the count of said pulse-counting means identifying the rank of a cell illuminated through the other of said lens members, and switchover means controlled by said scanning means and by said threshold means for loading said first storage means from said pulse-counting means in an initial phase of a cycle and loading said second storage means from said pulse-counting means in a terminal phase of a cycle following the sampling of all cells illuminated through said one of said lens members.

7. The combination defined in claim 6, further comprising switching means controlled by said threshold means for changing the stepping of said pulse-counting means by said timing means from a normal rate synchronized with the advance of said scanning means to a reduced rate equal to half said normal rate in the presence of an output signal indicative of intense illumination.

8. The combination defined in claim 1 or 2 wherein said sensor is duplicated in different areas of said detection site for intercepting radiation from two different directions converging at said source.

9. The combination defined in claim 1 or 2 wherein said source is part of a group of three virtual point sources of predetermined and invariable relative positions jointly movable with reference to said sensor, said processing means being provided with switching circuitry for individually exciting said sources in cyclic succession.

10. The combination defined in claim 9 wherein said sensor is disposed in a cockpit of an aircraft and said group of sources is mounted on a helmet of a pilot occupying said cockpit.

11. The combination defined in claim 10 wherein said group of sources is duplicated on opposite sides of said helmet, said sensor being duplicated on opposite sides of said cockpit.

12. In a system for monitoring the movement of a virtual point source of luminous radiation relative to a detection site, the combination with said source of a radiation sensor at said detection site comprising:

elongate radiation-detecting means forming at least one linear array of closely adjoining cells positioned for irradiation by two narrow beams of incident radiation lying in mutually orthogonal planes;

scanning means for sequentially sampling said cells in a succession of sweep cycles;

threshold means connected to said scanning means for receiving therefrom an output signal varying with the degree of illumination of the sampled cells;

timing means responsive to said threshold means for advancing said scanning means at a predetermined speed;

pulse-counting means stepped by said timing means under the control of said threshold means at a normal rate synchronized with said scanning means in the presence of low illumination and at half said normal rate in the presence of high illumination;

storage means controlled by said threshold means to register the count of said pulse-counting means at the end of a period of high illumination to identify the rank of a cell substantially midway in a series of adjoining cells simultaneously illuminated by either of said beams; and processing means connected to said storage means for determining from said count the direction of incidence of each of said beams.

* * * * *